(12) United States Patent
Deng

(10) Patent No.: US 11,620,410 B1
(45) Date of Patent: Apr. 4, 2023

(54) DIGITAL CONTENT MANAGEMENT USING SENTIMENT DRIVEN AND PRIVACY PRIORITIZATION ADJUSTABILITY

(71) Applicant: META PLATFORMS, INC., Menlo Park, CA (US)

(72) Inventor: Zi Yu Daniel Deng, San Ramon, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 113 days.

(21) Appl. No.: 17/016,025

(22) Filed: Sep. 9, 2020

(51) Int. Cl.
*G06F 21/00* (2013.01)
*G06F 21/62* (2013.01)
*G06F 21/64* (2013.01)

(52) U.S. Cl.
CPC .......... *G06F 21/6263* (2013.01); *G06F 21/64* (2013.01)

(58) Field of Classification Search
CPC .............................. G06F 21/6263; G06F 21/64
See application file for complete search history.

(56) References Cited

U.S. PATENT DOCUMENTS

| 8,615,434 B2 * | 12/2013 | Benyamin | G06Q 50/01 705/14.54 |
| 10,217,128 B2 | 2/2019 | Ferber et al. | |
| 2007/0055565 A1 * | 3/2007 | Baur | G06Q 10/02 705/14.69 |
| 2010/0257023 A1 | 10/2010 | Kendall et al. | |
| 2015/0128285 A1 * | 5/2015 | LaFever | H04L 63/0414 726/26 |
| 2018/0130096 A1 * | 5/2018 | Dun | H04L 67/10 |
| 2019/0087865 A1 * | 3/2019 | Loree | G06Q 30/0269 |

OTHER PUBLICATIONS

Guang Qiu, et al., "DASA: Dissatisfaction-oriented Advertising based on Sentiment Analysis", Sep. 2010, 6182-6191.

* cited by examiner

*Primary Examiner* — Ghazal B Shehni

(57) ABSTRACT

According to examples, a system for sentiment driven risk adjustable digital content management is provided herein. The system may include a processor and a memory storing instructions, which when executed by the processor, cause the processor to perform risk mitigating actions. These may include receiving sentiment data associated with a user and at least one of digital content, user group, or digital content provider. The processor may also aggregate the received sentiment data to measure and track sentiment associated with at least one of the user, the digital content, the user group, or the digital content provider. The processor may further determine sensitivity and risk metrics for at least one of the user, the digital content, the user group, or the digital content provider, based on the aggregated sentiment data. The processor may also provide data driven risk mitigation measures for privacy protection in digital content management based on the determined sensitivity and risk metrics.

20 Claims, 8 Drawing Sheets

300B

Content Provider is trying to reach people it thinks is interested in Subject A, Subject B, and more.

Social Networking System added interests to your account based on your actions, engagement, preferences, history, etc.

What You Can Do

See the full list of interests that's related to this content. You can remove the interest from your profile.

Subject A          Remove
Subject B          Remove
...
Subject X          Remove 🏷️ Review all your interests

"Why Am I Seeing This?"
🔒 *Only you can see this*

You are seeing this digital content because your information matches Content Provider's request. Here could also be more factors not listed here. Learn More

- Content Provider is trying to reach people it thinks is interested in Subject A, Subject B, and more.
- Content Provider is trying to reach Demographic C.
- Content Provider is trying to reach people whose primary location is Geographic Location D.

What You Can Do

✖ Hide all content from this content provider
*You won't see any more content from this provider*

⚙ Make changes to your preferences
*Adjust settings to personalize your content*

| targeting_name | DCSI |
|---|---|
| Radical Extremist's Name | 8.05 |
| Controversial Religious Group A | 5.59 |
| Polarizing Political Group A | 4.49 |
| Questionable Movie Title A | 4.44 |
| Unpopular Political Leader | 4.32 |
| Questionable TV Series A | 4.31 |
| Polarizing International Issue | 4.2 |
| Questionable TV Series A | 4.08 |
| Questionable Moral Practice | 4.07 |
| Controversial Religious Group B | 4.07 |
| Racist College Mascot Name | 3.96 |
| Polarizing Political Group B | 3.84 |
| Questionable TV Series B | 3.84 |
| Polarizing Political Group C | 3.81 |

FIG. 4A

DIGITAL CONTENT MANAGEMENT USING SENTIMENT DRIVEN AND PRIVACY PRIORITIZATION ADJUSTABILITY

TECHNICAL FIELD

This patent application relates generally to digital content management, and more specifically, to systems and methods for digital content management and provisioning using sentiment driven and privacy prioritization adjustability.

BACKGROUND

With recent advances in mobile technology and social media, the way people interact with or respond to digital content, such as textual content, images, videos, or interactive media, on their computing devices is constantly evolving. As vast quantities of digital content are being thrust upon users, balancing personal privacy and digital content distribution is becoming increasingly difficult.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 3A-3B illustrate screens of sentiment monitoring and feedback features for sentiment driven risk adjustable digital content management, according to an example.

FIGS. 4A-4B illustrate graphs for digital content sensitivity index for sentiment driven risk adjustable digital content management, according to an example.

DETAILED DESCRIPTION

Figure 1A:
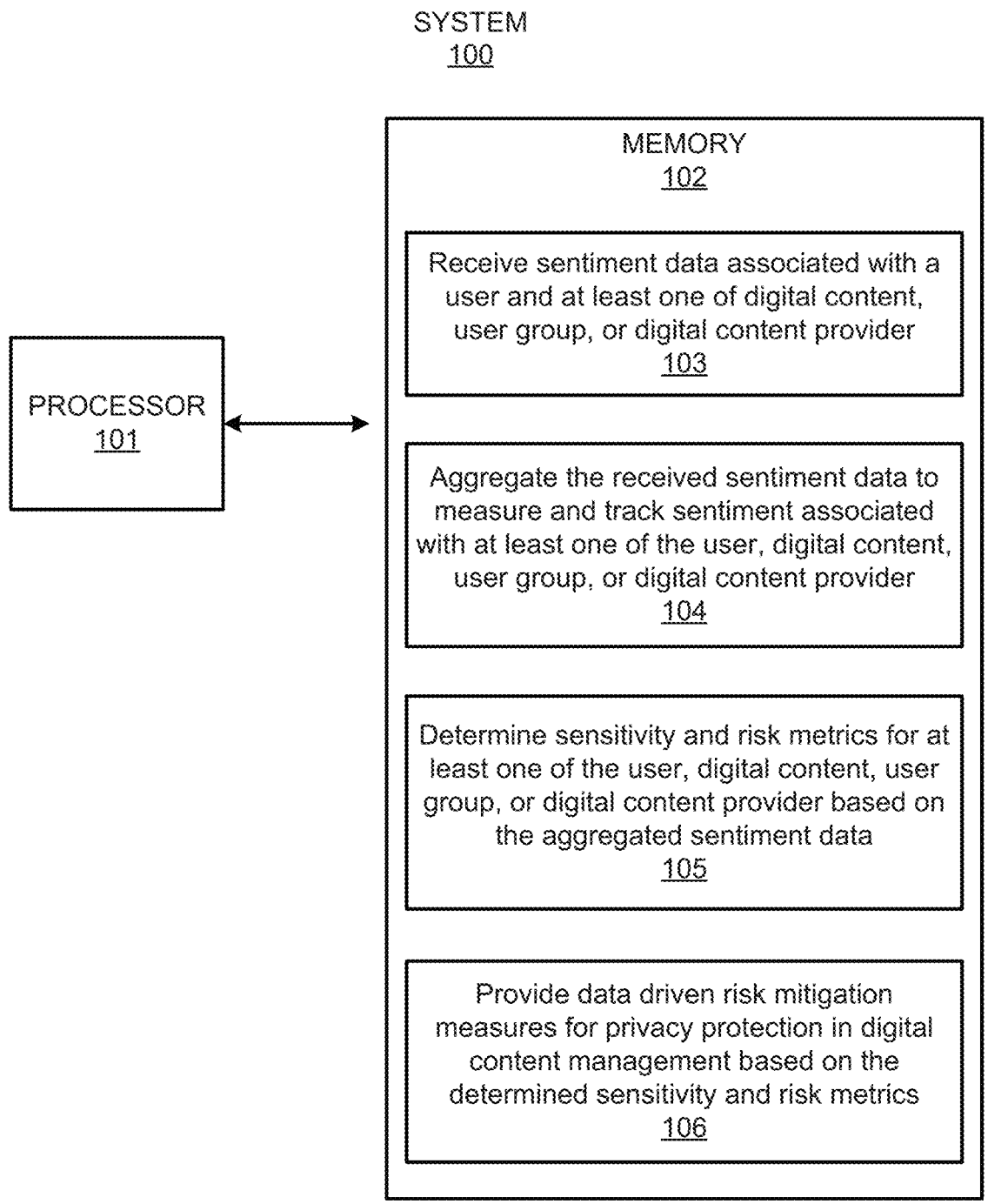
FIG. 1A illustrates a block diagram of a system for sentiment driven risk adjustable digital content management, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Advances in content management and media distribution are causing users to engage with more and more content on or from a variety of content platforms. This content may include a variety of content, such as textual content, images, videos, and/or interactive media. With this increase in data communications, which at times may include transmission of data that might be considered private or sensitive (or content that generates positive or negative sentiment), balancing individual privacy concerns with digital content distribution priorities of content providers is becoming increasingly difficult.

For example, a social networking system may allow various internal or external content providers (e.g., advertisers) the ability to create content and use various products to target audiences or users of the social networking system with any number of specific digital content (e.g., targeted advertisements). In some examples, these products may be established from data or information associated with any number of users. This data or information, for instance, may be voluntarily given by users, collected from the social networking system or third-parties, and/or otherwise obtained, inferred, or deduced from other sources and techniques (e.g., machine learning or analytics-based predictive systems), some or all of which may be used to present content that is relevant to users on the social networking system.

The data or information about users and their preferences may be obtained from a variety of signal types. These may include, but not limited to, personal and user attributes, personal content, location data, user actions (e.g., likes, clicks, shares, signups, facial recognition or changes in user gaze, or other user-content engagement action), user or target (affinity) groups, or sensitive topics (e.g., healthcare, protected classes, crime, alcohol, or other sensitive topic), etc. A signal type, as used herein, may refer to any type of signal based on any criteria. For example, this may include, but not limited to, source of signals, attributes of signals, semantics of signals, how signals are collected, etc. Examples of some of these signals may include, but not limited to, applications where signals originate or communicated, offline vs. online signals, web vs. mobile signals, etc.

It should be appreciated that these signal types may include privacy risks as well, which may be borne from one or more levels of a forward propagation loop (or data flow chain), as follows:

[User]>[Signals]>[Groups]>[Content]>[User]

In this forward propagation loop, data and information (e.g., about users) may flow forward from user to signals to groups (e.g., target groups) to content (e.g., advertisements associated with potentially "sensitive" target groups) and then back to the user, which may or may not be the same user. This forward propagation loop will be described in more detail with respect to at least FIG. 2 below.

It should be appreciated that identifying "sensitive" data is not without its challenges. For example, a particular piece of data, by itself, may not be considered sensitive. However, that data when aggregated with other data may be considered sensitive, or viewed, in the aggregate, as positive or negative (or inducing positive or negative sentiment). As a result, many new laws and legislation are being passed to better protect any such private, personal, and/or sensitive data.

The General Data Protection Regulation (GDPR), for example, is a privacy regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. Since the passage of the GDPR, other various privacy regulations have also been passed. These and other new laws are having an impact to companies, organizations, and/or entities that are entrusted or in possession of potentially private, personal, and/or sensitive data. However, given the large quantities, and typically distributed nature, of such data that may be stored and managed by any particular entity or platform (or how such data may be perceived), it is a serious technical challenge for organizational entities to identify exactly what data is considered "sensitive" data and manage such data under these newly developed data protection laws.

Furthermore, many companies do not have adequate practices or mechanisms in place to handle all the requirements associated with these privacy laws and regulations, and therefore are subject to undue risk. For example, non-EU companies doing international business may not have an up-to-date implementation strategy to properly manage the potentially personal, private, and/or sensitive data in their possession. These companies typically also lack knowledge and expertise to adjust to changing requirements to new laws as they arise. Without proper adaptation to this changing landscape, many organizational entities may expose themselves to undue risk, damaged customer relationships or commercial partnerships, and/or other adverse outcomes.

In accordance with the GDPR and other various policies or regulations, such as the California Consumer Privacy Act (CCPA), not to mention other established privacy and legal standards, such as Federal Trade Commission (FTC) or Housing, Employment and Credit (HEC) commitments, and similar privacy initiatives many organizational entities are now implementing, it has become imperative to employ a systems and methods so that a content platform is capable of balancing individual privacy concerns with digital content distribution priorities of content providers.

Accordingly, the systems and methods described herein may allow users of a social networking system, for example, to find out why he or she is receiving or being presented certain digital content (e.g., targeted advertisement). For example, a social networking system may use a sentiment measuring and tracking feature (or sentiment tracker), such as a "Why Am I Seeing This Ad" (WAIST) feature, or other similar technique or mechanism. In some examples, the WAIST feature may allow a user, who is presented with digital content, to interact with the social networking system to find out why he or she was presented with that particular digital content. The user, for instance, may click on a link associated with the WAIST feature and discover, among other things, that she is: (i) part of a particular demographic (e.g., age range, etc.) that is being targeted, (ii) within a particular geography (e.g., location data, state, city, zip code, etc.), and/or (iii) part of a targeted (affinity) group associated with that content based on any number of reasons, such as user preferences, history, likes, behaviors, and trends. The sentiment tracker (or WAIST feature) may not only inform the user the reason(s) she is being presented with the digital content, but, in some examples, may also allow the user to perform any number of subsequent actions. For example, these may include, but not limited to, blocking the content provider (e.g., advertiser) from further presentation to the user any additional content (or other related content) (e.g., targeted advertisement), removing herself from the group that is being targeted by the content provider, or disassociating herself from this or other similar content presented from this or any other content provider.

It should be appreciated that the user's engagement with the sentiment measuring and tracking feature offered by the social networking system, for example, may therefore provide a way to ascertain user sentiment associated with any particular digital content. This user sentiment may also be determined for any existing vertical (e.g., content provider, target group, etc.). To put another way, the sentiment measuring and tracking feature of the systems and methods described herein may provide a sensitivity gauge that is triggered at the user or digital content (advertisement) level. This sensitivity gauge may be used to determine user sentiment at other levels as well, and may further be attributed to the target (group) level and/or to the signal level of the propagation loop.

The systems and methods described herein may thereby leverage any sensitivity data (or sensitivity feedback), received from the sentiment measuring and tracking feature or other similar mechanism, to determine and/or adjust any number of risk levels (e.g., risk scores or vectors). This risk level, for instance, may be used to balance privacy priorities among content providers (or advertisers), users, and social media systems. In other words, the systems and methods described herein may provide sentiment driven risk adjustable digital content management to enable a privacy-first digital content platform that not only meets current privacy regulations and standards, but to prioritize privacy concerns and mitigate content-related risk.

By measuring and tracking sensitive sentiments towards digital content at each of the various verticals, it should be appreciated that signal-to-targeting end-to-end risk levels (scores or vectors) to complete the feedback loop may be derived. In this way, sustainable business and long-term user relationships may be established when factoring in risk levels from both users and digital content. Ultimately, this may create a more personalized risk adjustable digital content management experience.

Overall, the systems and methods described herein may reduce risk exposures and better protect individual privacy, which may in turn obviate high risk/low impact signals and targeting groups, as well as cut storage and computing costs, among other things. Furthermore, the systems and methods described herein may also enhance business integrity operations by measuring, in real-time or near real-time, daily sentiments by interest groups or users and allowing proactive actions by users before potential privacy escalations occur. In addition, the systems and methods described herein may provide a more viable ecosystem that optimizes the reduction of risks for both users and content providers, creating a more reliable risk adjustable infrastructure. These and other examples will be described in more detail below.

It should be appreciated that the systems and methods described herein may be particularly suited for digital content management or delivery (e.g., advertisements or ads), but are also applicable to a host of other distributed content or media. These may include, for example, content or media associated with data management platforms, search or recommendation engines, social media, and/or data communications involving communication of potentially personal, private, or sensitive data or information. Furthermore, for digital content associated with consumption or distribution of goods or services, the systems and methods described herein may also be used in a variety of environments, such as online auctions, financial transactions, etc. These and other benefits will be apparent in the description provided herein.

Figure 1B:
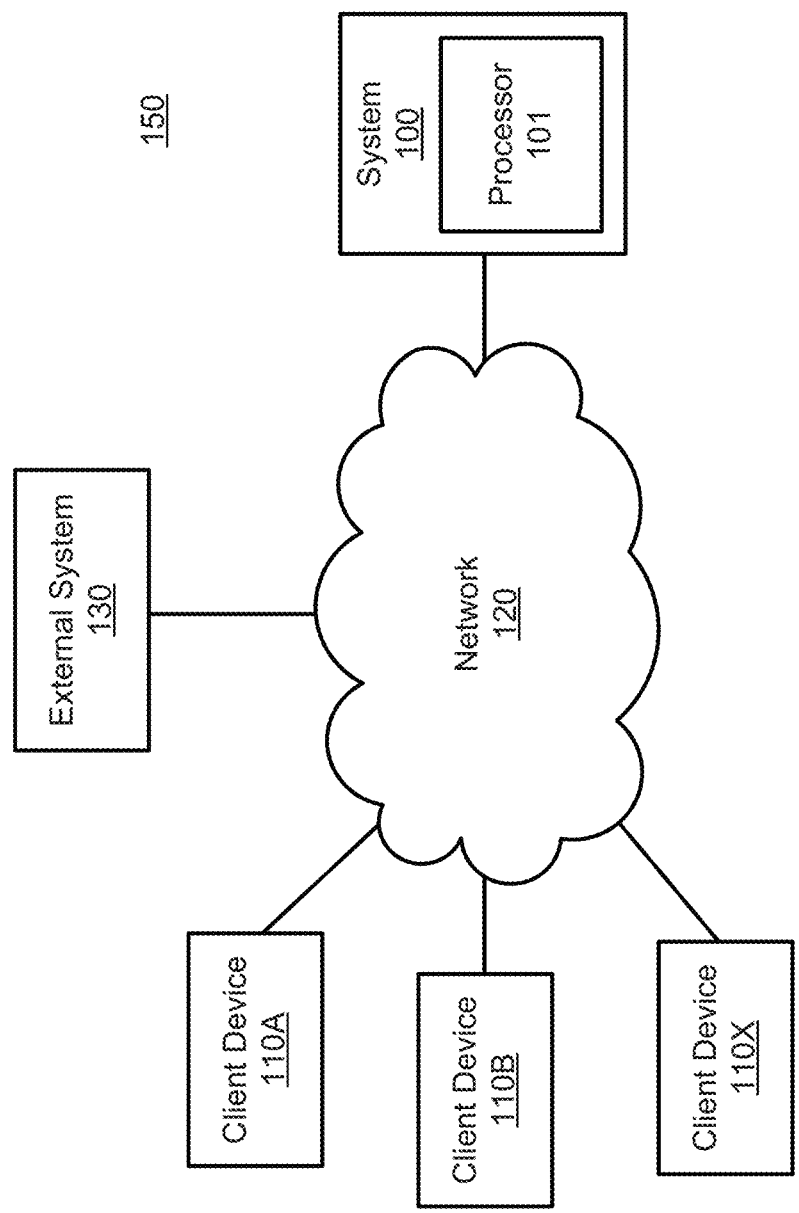
FIG. 1B illustrates a block diagram of a system environment for the system for sentiment driven risk adjustable digital content management, according to an example.

Reference is now made with respect to FIGS. 1A and 1B. FIG. 1A illustrates a block diagram of a system 100 for sentiment driven risk adjustable digital content management, according to an example. FIG. 1B illustrates a block diagram of a system environment 150 for the system 100 for sentiment driven risk adjustable digital content management, according to an example. It should be appreciated that the system 100 depicted in FIGS. 1A-1B and/or the system environment 150 depicted in FIG. 1B may be examples. Thus, the system 100 and/or the system environment 150 may or may not include additional features and some of the features described herein may be removed and/or modified without departing from the scopes of the system 100 and/or the system environment 150 outlined herein.

As shown in FIG. 1B, the system environment 150 may include any number of client devices 110, shown as client devices 110A, 110B, and 110X, in which the variable "X" may represent an integer greater than one. The system environment 150 may also include a network 120, and an external system 130.

In operation, the system 100 may communicate with the client devices 110, the external system 130, and/or other network elements via the network 120. In some examples, the system 100 may receive or transmit data to/from the client devices 110, the external system 130, and/or other network elements in order to facilitate presentation of digital content or media to users via the client devices 110, or receive user action input from the client devices 110 in response to such digital content or media presented to users. In some examples, the system 100 may be a social networking system, a content sharing network, an advertisement system, an online system, and/or any other system that facilitates any variety of data processing in personal, social, commercial, financial, and/or enterprise environments.

In some examples, the system 100 may include a processor 101 and a memory 102, as shown in FIG. 1A. The memory 102 may store instructions, which when executed by the processor 101, may cause the processor to receive 103 sentiment data associated with a user and at least one of digital content, user group, or digital content provider, aggregate 104 the received sentiment data to measure and track sentiment associated with at least one of the user, the digital content, the user group, or the digital content provider, determine 105 sensitivity and risk metrics for at least one of the user, the digital content, the user group, or the digital content provider, based on the aggregated sentiment data, and provide 106 data driven risk mitigation measures for privacy protection in digital content management based on the determined sensitivity and risk metrics.

As described in more detail below, to determine a sentiment driven risk level for digital content, the processor 101, as instructed by machine-readable instructions stored in the memory 102, may receive 103 sentiment data associated with a user and at least one of digital content, user group, or digital content provider. To better gauge sensitivity of a particular digital content, the processor 101 may aggregate 104 the received sentiment data to measure and track sentiment associated with at least one of the user, the digital content, the user group, or the digital content provider. To do this, the processor 101 may, in some examples, measure and track user actions associated with the sentiment measuring and tracking feature. In other words, the processor 101 may receive any number of user actions associated with a user choosing to opt-out of particular digital content, blocking a digital content provider from further presentation of the digital content (or other content), or removing him or herself from a target (affinity) group targeted by the digital content provider.

For example, if many users being shown a particular digital content remove themselves from a particular target group that is being targeted with that digital content or block that digital content provider, this user action may be indicative of a particular sensitivity to the digital content aimed at the user, a particular sensitivity to being associated with this target group, or a particular sensitivity to this digital content provider. Such sensitivities, which may be understood as negative sentiments, would help inform the system 100, for instance, to alter its practices and perhaps promote or encourage a more privacy-friendly platform to manage digital content distribution between the users and digital content providers.

These particular sensitivities (or sentiments) may be measured, calculated, and/or converted or transformed into risk levels using any number of techniques or mechanisms. The processor 101, for instance, may determine 105 sensitivity and risk metrics for at least one of the user, the digital content, the user group, or the digital content provider, based on the aggregated sentiment data. Once the sensitivity level is determined, the processor 101 may then provide 106 data driven risk mitigation measures for privacy protection in digital content management based on the determined sensitivity and risk metrics. As described in more detail below, it should be appreciated that in this way, the system 100 may mitigate unnecessary risk and create a platform that is better-suited to connect organization entities (e.g. businesses and advertisers) and users in a privacy respectful way on a digital content management platform.

Also described in more detail below, the system 100 may collect, calculate, and/or generate sentiment driven risk adjustable values (e.g., vectors). In some examples, the system 100 may utilize any number of artificial intelligence (AI) based machine learning (ML) techniques, or other mechanisms or processes. Details of the system 100 and its operation within the system environment 150 will be described in more detail below. Furthermore, the data flow in matrix representation, which may represent the calculations and determinations of sentiment driven risk adjustable values or vectors, will be described in more detail below as well.

As shown in FIGS. 1A and 1B, the system 100 may enable any number of client devices 110 communicatively coupled to the system 100. In some examples, this may help provide sentiment feedback so that a privacy-first approach may be offered by any number of social networking systems. In this way, the system 100 may better balance customer experience and privacy priorities for users and/or content providers.

It should be appreciated that the processor 101 may be a semiconductor-based microprocessor, a central processing unit (CPU), an application specific integrated circuit (ASIC), a field-programmable gate array (FPGA), and/or other suitable hardware device. In some examples, the memory 102 may have stored thereon machine-readable instructions 103-107 (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, and the like. The memory 102, which may also be referred to as a computer-readable storage medium, may be a non-transitory machine-readable storage medium, where the term "non-transitory" does not encompass transitory propagating signals.

Each of the client devices 110 may be a computing device that may transmit and/or receive data via the network 120. In this regard, each of the client devices 110 may be any device having computer functionality, such as a television, a radio, a smartphone, a tablet, a laptop, a watch, a desktop, a server, or other computing or entertainment device or appliance. In some examples, the client devices 110 may be mobile devices that are communicatively coupled to the network 120 and enabled to interact with various network elements over the network 120. In some examples, the client devices 110 may execute an application allowing a user of the client devices 110 to interact with various network elements on the network 120. For instance, the client devices 110 may receive data from user input, a database, a file, a web service, and/or via an application programming interface (API). Additionally, the client devices 110 may execute a browser or application to enable interaction between the client devices 110 and the system 100 (or external system 130, etc.) via the network 120. For example, a user may interact with a mobile application or a web application, executing via a browser, and receive and interact digital content via the network 120. In an example, the client devices 110 may interact with the system 100 through application programming interfaces (APIs) running on a native or remote operating systems of the client devices 110. In this example, the external system 130 may be a digital content provider (e.g., advertiser). Other various examples may also be provided.

Although one or more portions of the system 100 and/or external system 130 may reside at a network centric location, as shown, it should be appreciated that any data or functionality associated with the system 100, the external system 130, and/or other network element may also reside locally, in whole or in part, at the client devices 110, or at some other computing device communicatively coupled to the client devices 110.

The network 120 may be a local area network (LAN), wide area network (WAN), the Internet, a cellular network, a cable network, a satellite network, or other network that facilitates communication between the client devices 110, the external system 130, the system 100, and/or any other system, component, or device connected to the network 120. The network 120 may further include one, or any number of, the exemplary types of networks mentioned above operating as a stand-alone network or in cooperation with each other. For example, the network 120 may utilize one or more protocols of one or more clients or servers to which they are communicatively coupled. The network 120 may facilitate transmission of data according to a transmission protocol of any of the devices and/or systems in the network 120. Although the network 120 is depicted as a single network in FIG. 1B, it should be appreciated that in some examples, the network 120 may include a plurality of interconnected networks as well.

The external system 130 may be communicatively coupled to the network 120. In some examples, the external system 130 may host a third-party website, or any content or data source, that provides content or data to the client devices 110, and/or the system 100. In some examples, the external system 130 may be a data center with servers to store and/or provide information associated with digital content or media (e.g., advertisements). In some examples, the external system 130 may also provide digital media content to the client devices 110, the system 100, and/or other network elements (not shown) in the system environment 150. In some examples, the external system 130 may include one or more application servers that host various applications for the client devices 110, the host systems 140, the system 100, and/or other network elements. Other various examples may also be provided.

Figure 2:
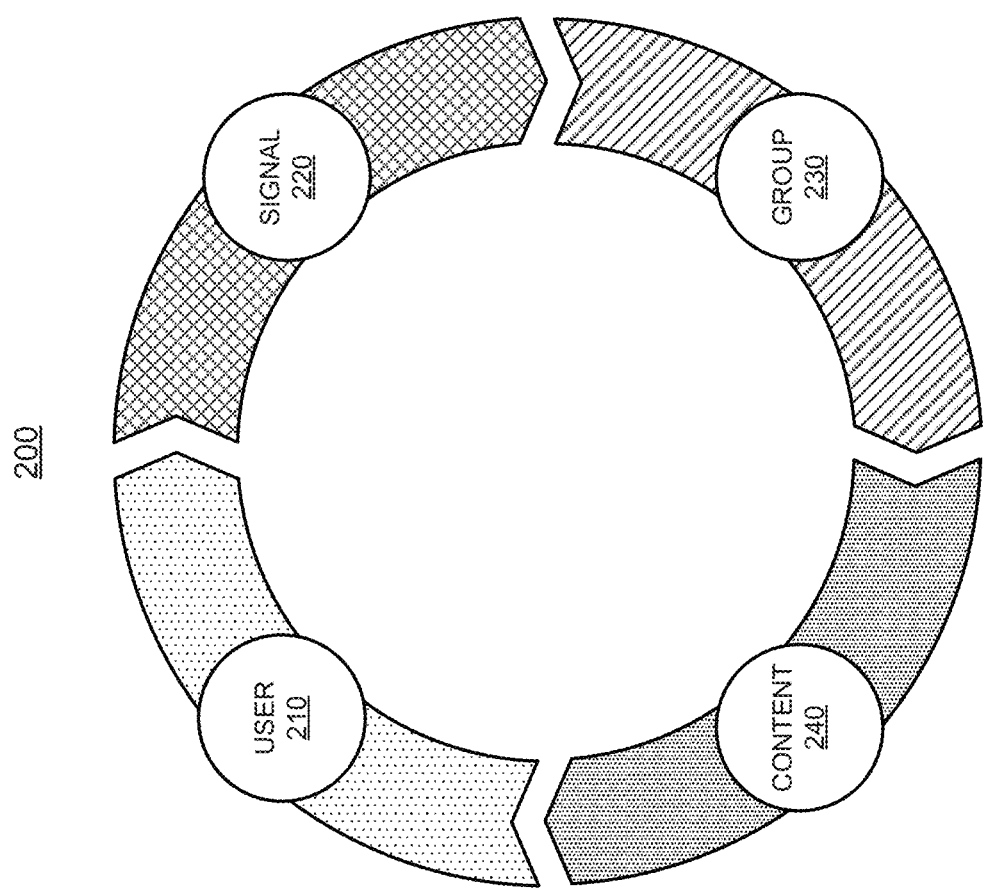
FIG. 2 illustrates a block diagram of a digital content forward propagation loop for sentiment driven risk adjustable digital content management, according to an example.

FIG. 2 illustrates a block diagram 200 of a digital content forward propagation loop for sentiment driven risk adjustable digital content management, according to an example. In some examples, the digital content forward propagation loop may include one or more levels. As shown in block diagram 200, these levels may include a user 210, a signal 220, a group 230 (e.g., target), and a content 240 (e.g., ad), all of which may represent a sequence of data and information flow. Each level may have any number of privacy risks.

In some examples, the data flow may be simplified using a matrix representation, as follows:

$$[U \times S] * [S \times T] * [T \times A] * [A \times U],$$

where "U" represents the user 210, "S" represents the signal 220, "T" represents the group 230 (or target), and "A" represents the content 240 (or ad), and where each of the matrices of the matrix representation may be understood as follows:

[U×S] "User by Signal" matrix, with
Risk Adjusted life-time-Value [RAV]=[R]*[V] for each user, where [R]=Risk vector, with default risk scores assigned to each signal (e.g. protected classes, privacy, topics, location, behavior, action, etc.), and [V]=Value vector for a given user (LTV, revenue, etc.);

[S×T] "Signal by Targeting" matrix, representing weights of a signal in a targeting product, default to binary;

[T×A] "Targeting by Ads" matrix, representing weights of a targeting product used in an ad, default to binary; and

[A×U] "Ads by User" matrix, effectively impressions of a user seeing an ad, with [S] for each user, where [S]=Sensitivity vector for a given user, initiated by counts of WAIST ("Why Am I Seeing This").

To put this another way, the notion behind this, for example, is that for each user, the use of [S] (the sensitivity level as feedback) may be used to tweak or adjust [R] (the risk vector) via each level of the forward propagation loop. In this way, the sentiment driven risk adjustable level may be determined. Details of the calculations will be described in more detail below.

FIGS. 3A-3B illustrate screens 300A-300B of sentiment monitoring and feedback feature (or sentiment tracker) for sentiment driven risk adjustable digital content management, according to an example. FIG. 3A illustrates a screen 300A of sentiment monitoring and feedback feature for sentiment driven risk adjustable digital content management, according to an example. As shown in screen 300A, a social networking system may allow users to find out why he or she was targeted to see a particular digital content. In this example, the "Content Provider" (e.g., merchant or advertiser) may possess some information about a user (e.g., of a social networking system) that matched the Content Provider's targeting request(s) or requirement(s). As shown, the user, in this case, was presented with particular digital content (e.g., advertisement) because the user had demonstrated interest in "Subject A," "Subject B," and "more." For example, the Content Provider may be a diaper company and the user may have demonstrated interests in "motherhood," "infants," etc., and therefore this was one of the reasons the digital content (perhaps advertisements directed to diapers or other related products or services) was presented or shown to the user. The user may also be part of a particular demographic, such as "Demographic C," which in some examples may be a particular age range or group (e.g., 18-45 years old) that the Content Provider is trying to target. The Content Provider may also be trying to present content to users in a particular "Geographic Location," such as the United States, or something more specific like a state, city, zip code, or other geographic location.

The sentiment monitoring and tracking feature may allow the user, in this case, to take one or more actions. For example, the user may be able to hide, from view or possession, all or some content from the Content Provider or otherwise make changes to her settings, profile, and/or preferences, as shown in screen 300A.

FIG. 3B illustrates a screen 300B of sentiment monitoring and feedback feature for sentiment driven risk adjustable digital content management, according to an example. If the user chooses to investigate the specific "interests" that triggered deliver of diaper-related content to the user, as described with respect to FIG. 3A and screen 300A, the user may click the forward arrow (>) to do so. This may take the user to the screen 300B of FIG. 3B, where the user may further investigate the particular "interests," such as Subject A, Subject B, . . . , Subject X, where the variable "X" may represent an integer greater than one. Again, these various subjects may include, for example, "motherhood," "infants," etc., all of which may associate or link the Content Provider and/or the digital content presented or shown to the user with the user herself. In order to comply with internal and/or external privacy initiatives, regulations, or laws, the user here may be given the option to remove herself from the targeting by the advertiser, change her ad preferences, disassociate herself from targeting groups, block this advertiser or other similar advertiser, etc.

As described herein, these user actions may be collected as sentiment data and be used as a sensitivity gauge triggered at (user, ad) and/or (user, targeting) level, which can be further attributed to signal sensitivity at (user, signal) level to de-risk signal collection and processing that put the user into various targeting groups. In other words, the system 100 may be able to leverage the sensitivity feedback to achieve multiple goals. For instance, this may include mitigating user signal collection and usage risks, which may entail personalized signal sensitivity and risk mitigation in compliance of policies, legal, PR, regulation, integrity, FTC regulations, etc. In another example, this may include quantifying ad sentiment, which may involve proactive ads monitoring and alerting based on ads sensitivity index. Furthermore, a long term ecosystem may be sustained, which may include better balancing and optimizing relationships among advertisers/businesses, users and social networking platforms, etc. towards a privacy-first content platform.

It should be appreciated that the sentiment data may be real-time (or near real-time) direct sentiment feedback at one or many of the following granularities: user-digital content, user-target group, and/or user-content provider. The system 100 may also enable collecting such sentiment feedback from a plurality of users. Harvesting the aggregated data may then allow the system 100, for example, to measure risks at multiple levels of the forward propagation loop, such as user 210, signal 220, group 230, and content 240 and, as shown in FIG. 2, not to mention the content provider as well.

Figure 4B:
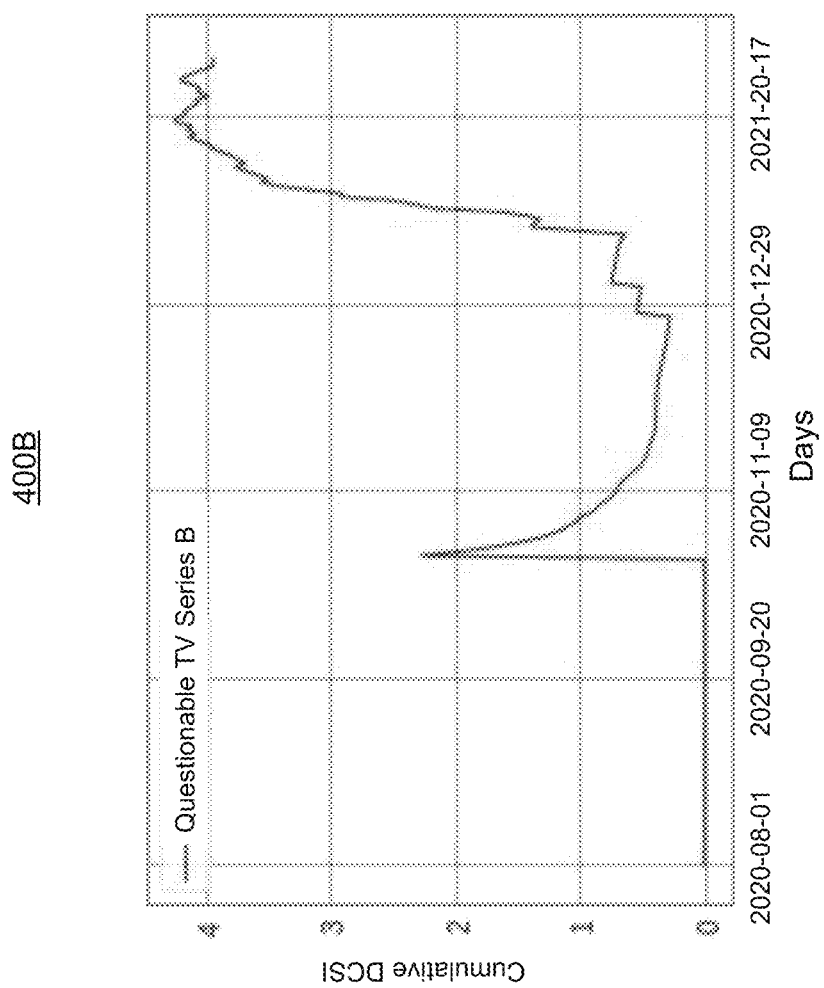

FIGS. 4A-4B illustrate graphs 400A-400B for digital content sensitivity index for sentiment driven risk adjustable digital content management, according to an example. FIG. 4A illustrates a graph 400A for digital content sensitivity index for sentiment driven risk adjustable digital content management, according to an example. As shown, there may be any number of target groups, which may be represented as "targeting_name," that may include any number of potentially sensitive groups. These may include, "Radical Extremist's Name," "Controversial Religious Group A," "Polarizing Political Group A," etc. A few notable ones, such as "Questionable Movie Title A," "Polarizing Political Group B," and "Questionable TV Series B," may be highlighted. Each of these groups may have a corresponding digital content sensitivity index (DCSI).

In some examples, the DCSI may represent some of the target groups with the highest drop-out ratio (DR). It should be appreciated that, in some examples, a high DCSI may be indicative of a negative sentiment. In other words, the target groups shown in graph 400A may represent some of the more highly sensitive groups.

FIG. 4B illustrates a graph 400B for digital content sensitivity index for sentiment driven risk adjustable digital content management, according to an example. As shown, the graph 400B may represent a snapshot of the daily fluctuation of one of the target groups in graph 400A. For example, the "Questionable TV Series B" may be a show that has garnered some controversy and users' actions (sentiment feedback) may be represented here. Again, this sentiment feedback may be used for digital content management, and may be helpful in monitoring and alerting the system 100, for example, to proactively adjust risk related digital content delivery and management.

It should be appreciated that risk levels may be determined by calculating various risk vectors. These risk levels may be determined for each of the multiple levels of the forward propagation loop, including user 210, signal 220, group 230, and content 240 and, as shown in FIG. 2, not to mention the content provider as well. As described herein, determining the risk level for each of these propagation levels may be used to effectively manage risks based on real-time sentiment feedback for risk mitigation. In some examples, determining the various risk levels may include mapping as well. For instance, risk determination may be based on collected sentiment statistics (or stats) at any number of levels, such as user-digital content, user-content provider, user-target group, and aggregated risk levels may be calculated directly at digital content (ad), content provider (advertiser), and/or user levels, and may be derived indirectly at the group (or targeting) level by mapping group-digital content (e.g., targeting-ads) and the signal level by mapping the signal-group. This may be achieved, for instance, via a sentiment back propagation manner, and up the same propagation loop of FIG. 2. A backward propagation loop (or data flow chain) may therefore be provided as follows:

[User]<[Signals]<[Groups]<[Contents]<[User]

This illustrates the backflow from user sentiment data backward and up the chain to calculate sentiment metrics for any entity, which can be used to effectively manage contents, groups and signals to best understand then align with user privacy preferences for privacy protection and regulation compliance across the chain.

Over the time, aggregated sentiment data may allow the system 100 to determine and/or calibrate risk levels (scores) at each and every level along the data flow pipeline, which in turn may allow the system 100 to use risk levels (scores)

in each and every component to adjust risks accordingly, mitigating risks across the chain and optimizing business models.

As described above, the data flow may be simplified by using matrix representations. More specifically, various data structures may be used. For example, the data flow for the forward propagation loop may be shown as a matrix representation, as follows:

$$S[U \times S] * M[S \times T] * M[T \times A] * S[A \times U],$$

and $$S[U \times S] * M[S \times T] * S[T \times U],$$

where "S" may represent a sensitivity matrix and "M" may represent a mapping based on relationship between the entities involved, and where each matrix may be described as follows:

S[U×S] may represent User-by-Signal sensitivity matrix where each cell may represent the sensitivity score of a user (row) against a signal (column). In general, the higher the value, the more sensitive the user to the signal;

M[S×T] may represent Signal-by-Targeting mapping, where the mapping from signals to targeting groups, where each cell may be a weight (0 to 1) indicating significance of the signal in forming the targeting group;

M[T×A] may represent Targeting-by-Ads mapping, representing the mapping between targeting groups to ads, where each cell is a weight (0 to 1) indicating the significance of the targeting group for the ad;

S[A×U] may represent Ads-by-User sensitivity matrix, where each cell is a count of WAIST clicks upon the ad impressions;

S[T×U] may represent Targeting-by-User sensitivity matrix, where each cell is a count of WAIST action s, i.e. user opted out of the targeting group; and M[B×A] may represent Advertiser-by-Ads mapping. Business creates ads from its advertiser account.

The following risk levels (e.g., scores or vectors) may be derived from the above sensitivity and/or mapping matrices, where:

R[S] represents a signal risk vector across all users. High risk signals are likely problematic. In some examples, high risk yet low value signals may be dropped to save costs;

R[T] represents a targeting group risk vector across all users. In general, targeting groups may be any form of targeting segments/products/clusters. Targeting groups with high risk scores may be red flagged for review;

R[A] represents an ad or content risk vector across all users. In some examples, this risk component may be deducted from the ad score to reflect negative sentiment lowering a ranking of the digital content;

R[U] represents a user vector across all signals. Users with high risk scores may generally be considered as highly sensitive with a low risk tolerance threshold to match content; and R[B] represents a business (advertiser, content provider, etc.) risk vector across all users. In general, this may be matched up with each content provider or organizational entity's predetermined risk threshold to assess risks when evaluating, approving, and/or disapproving content.

In some examples, when given a predetermined period of time, the following may be one way to determine risk level (e.g., score or vector) from sentiment data (e.g., WAIST sensitivity scores):

Calculate S[A×U]. Each cell, which may represent a unique (ad, user) pair, the sensitivity score=sum(WAIST clicks)/sum(Ad/Content impressions), which in some examples may be a ratio of the total number of WAIST clicks by this user to the total number of this ad/content's impressions to this user.

Calculate S[T×U]. As a potential first calculation, each cell, which may represent a unique (target group, user) pair, the sensitivity score=sum(WAIST actions)/sum(WAIST clicks), which may be a ratio of this user's actions dropping out of this targeting group to this user's related WAIST clicks. A potential second calculation may be to add implied sentiment indirectly via ads/contents. S[T×U]=a*S[T×U]+b*M[T×A] *S[A×U]. The first component calculated from step one reflects direct targeting group drop out ratio, vs the second component reflects implied sentiment from users towards exposed ads/contents impressions during a defined time period. One ad/content can have multiple target groups associated, where a and b here are tunable Parameters and used to balance weights between these two components: a*S[T×U] vs b*M[T×A]*S[A×U], with the former representing the direct sensitivity of users towards groups and latter implied sensitivity of users towards groups via ads or contents.

Calculate S[S×U]=M[S×T]*S[T×U]. S[S×U] may represent relationships between signals and users.

Calculate S[B×U]=M[B×A]*S[A×U]. S[B×U] may represent relationships between the businesses and users. M[B×A] may capture ads (or other content) provided by content providers.

R[S]—Collapse S[S×U] by users to derive the signal risk vector. This may involve any calculation, for example: R[S](i)=Average(S[S×U])(i), the vector value may simply be the average of the all values in the corresponding row from the matrix then normalized to between 0 and 1. For example, the collapse may include a max( ) or min( ) or any other algorithm.

R[T]—Collapse S[T×U] by users to derive the target group risk vector. This may involve any calculation, for example: R[T](i)=Average(S[T×U])(i), the vector value may simply be the average of the all values in the corresponding row from the matrix then normalized to between 0 and 1. For example, the collapse may include a max( ) or min( ) or any other algorithm.

R[A]—Collapse S[A×U] by users to derive the ads/contents risk vector. This may involve any calculation, for example: R[A](i)=Average(S[A×U])(i), the vector value may simply be the average of the all values in the corresponding row from the matrix then normalized to between 0 and 1. For example, the collapse may include a max( ) or min( ) or any other algorithm.

R[U]—Transpose S[S×U] to S[U×S] then collapse S[U×S] by signals to derive the user risk vector. This may involve any calculation, for example: R[U](i)=Average (S[U×S])(i), the vector value may simply be the average of the all values in the corresponding row from the matrix then normalized to between 0 and 1. For example, the collapse may include a max( ) or min( ) or any other algorithm.

R[B]—Collapse S[B×U] by users to derive the business risk vector. The method can be any calculation, for example: R[B](i)=Average(S[B×U])(i), the vector value may simply be the average of the all values in the corresponding row from the matrix then normalized to between 0 and 1. For example, the collapse may include a max( ) or min( ) or any other algorithm.

As described above, sentiment data may be harvested and used for risk adjustable digital content management (e.g., risk adjustable online advertising). The above determination steps may detail a variety of actions to: (i) calculate sensitivity matrices from user to ads, targeting groups, signals, advertisers respectively, and/or (ii) derive normalized risk scores/vectors for signals, targeting groups, ads, users and advertisers respectively, given any predetermined time period. These calculated levels or metrics may depict sentiment and risk profiles at various levels based on sentiment data or feedback.

The above determination may also be used to calculate both accumulated sentiment and risk scores for signals, targeting groups, ads and users throughout their respective life cycles. For example, imagine that each incremental time period may generate corresponding sentiment and risk score changes. These changes may be merged and/or aggregated by the system 100 into its lifetime sentiment/risk levels. In some examples, these lifetime sentiment and/or risk levels may be calculated throughout a lifetime of corresponding entities: users, signals, targeting groups, ads, advertisers. In some examples, a trendline may also be provided and visualized with historical metrics to track, monitor, and alert the system 100.

It should be appreciated that the above determination steps, for example, may be agnostic to specific models/implementations or any of the AI-based machine learning models used. For example, one example may include a ratio of sums while another may include a metric comparison on a logarithmic scale, with the following definitions and representations:

Signal—when combined with signal values, the risk score R[S] may be used to generate risk weighted signal values. For example, high risk yet low valued signals may be dropped to save costs, increase performance, reduce out-of-compliance risks and improve privacy.

Targeting groups—red flagged targeting groups with high risk scores R[T] should be reviewed to identify either high risk signal components or revised for less sensitivity. The mapping between signals and targeting groups/segments/products/clusters may be optimized for low risks.

New targeting group requests may be assessed automatically based on its signals risk scores for automatic approval/disapproval with tangible reasons. Automatic policy/regulation compliance auditing may be made possible by running audit scripts against specific policies captured as policy annotation structures with component risk thresholds.

Ads—with risk scores as a component of the overall ads score, high risk R[A] ads may be ranked lower hence getting less chance to be delivered. Offensive ads may bubble up on the ads risk scoreboard to be proactively dealt with in operations, paused or stopped. This may be carried out at all ad levels: ad campaign, ad set, ad, creative, placement, surface, application, page, etc.

Business—Advertiser, content provider, or other organizational entity with an above average number of risky ads launched may be whitelisted, watched and warned with tangible facts helping them to improve ads. Each advertiser account may have a predetermined risk threshold upon signup and adjusted over the time based on risk profiles of this account R[B]. This may help to automate such efforts and mitigate risks.

Users—users both as source of signals and viewers of ad impressions may play double roles in this loop. For the signal source role, the platform could minimize signal collection from users by focusing on only high value ones without compromising risks R[U]. For the ad impression viewer role, there should be a better match between ads/content and users on risk metrics beyond functional attributes. Various machine learning algorithms/deep neural network models, such as TTSN (Two Tower Sparse Neural network), LSTM (Long Short-Term Memory) Neural network, etc. may index, find, and efficiently match targeted users with ads/contents via risk embeddings: R[A] and R[U]. It should be appreciated that risk may be an inherent component of the ads/content score or ad/content metrics to reflect underlying risks. In other words, the risk embeddings may refer to condensed traits in order to best match the ads/content with users. Such risk vectors may represent risk profiles of entities (contents, ads, users, devices, groups, businesses, etc.) in an abstract form built from historical signals and may be continuously updated upon the arrival of new signals or transfer leanings.

As new events stream in, including but not limited to, ad or content impressions, WAIST clicks, user opt-in/opt-out actions, etc., the system 100 may refresh risk scores/vectors by either recalculating, or incrementally updating, to capture any changes (deltas or Δs) since a last refresh. Embeddings, which are typically abstract snapshots of underlying entities, may also be refreshed by re-training relevant models, and/or refreshing the embeddings to reflect any delta changes. Depending on infrastructure and data ingestion velocity, for instance, an end-to-end pipeline may be performed in either real-time (or near real-time) or batch mode to satisfy various Service Level Agreement(s) (SLA) for downstream consumption. To handle operational complexities, the pipeline may also be designed to be independent and reversible.

Overall, user sentiment towards ads and related targeting group drop out actions, represented as sentiment data (or WAIST stats), may be leveraged to calculate sensitivity matrices at each and every step of:

$$\text{the user} \rightarrow \text{signal} \rightarrow \text{targeting group} \rightarrow \text{ads} \rightarrow \text{user loop}$$

to introduce sentiment to this pipeline and associated business model. Furthermore, risk scores may be derived for each and every entity along this chain to effectively measure and proactively mitigate risks for a privacy first online ads platform.

Although not depicted, it should be appreciated that system 100 may also include various artificial intelligence (AI) based machine learning tools to help determine sensitivity and/or risk levels. For example, these AI-based machine learning tools may be based on optimization of different types of content analysis models, including but not limited to, algorithms that calculate and optimize the sentiment matrices for risk level (score/vector) determination. For instance, these AI-based machine learning tools may be used to generate models and/or classifiers that may include a neural network, a tree-based model, a Bayesian network, a support vector, clustering, a kernel method, a spline, a knowledge graph, or an ensemble of one or more of these and other techniques. These AI-based machine learning tools may further generate a classifier that may use such techniques. The system 100, as described herein, may use supervised learning, semi-supervised, and/or unsupervised learning to build the model using data in the training data store. Supervised learning may include classification and/or regression, and semi-supervised learning may require iterative optimization using objection functions to fill in gaps when at least some of the outputs are missing. It should also be appreciated that the system 100 may provide other types of machine learning approaches, such as reinforcement learning, feature learning, anomaly detection, etc.

In some examples, the system 100 may provide a manual mode of operation, where a user may narrow down selection with limited or without use of AI-based machine learning or other calculation engines. In some examples, the system 100 may also utilize some form of natural language processing (NLP) or other similar function to help facilitate matches. Other various similar or different features may also be provided.

It should be appreciated that classification algorithms may provide assignment of instances to predefined classes to decide whether there are matches or correlations. Alternatively, clustering schemes or techniques may use groupings of related data points without labels. Use of knowledge graphs may also provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation." Also, techniques that involve simulation models and/or decision trees may provide a detailed and flexible approach to providing various associations and facilitate calculating the sentiment and/or risk levels, as described herein.

It should be appreciated that the systems and subsystems, as described herein, may include one or more servers or computing devices. Each of these servers or computing devices may further include a platform and at least one application. An application may include software (e.g., machine-readable instructions) stored on a non-transitory computer-readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the processors, systems, subsystems, and/or other computing devices may be shown as single components or elements (e.g., servers), one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and/or 300.

Figure 5:
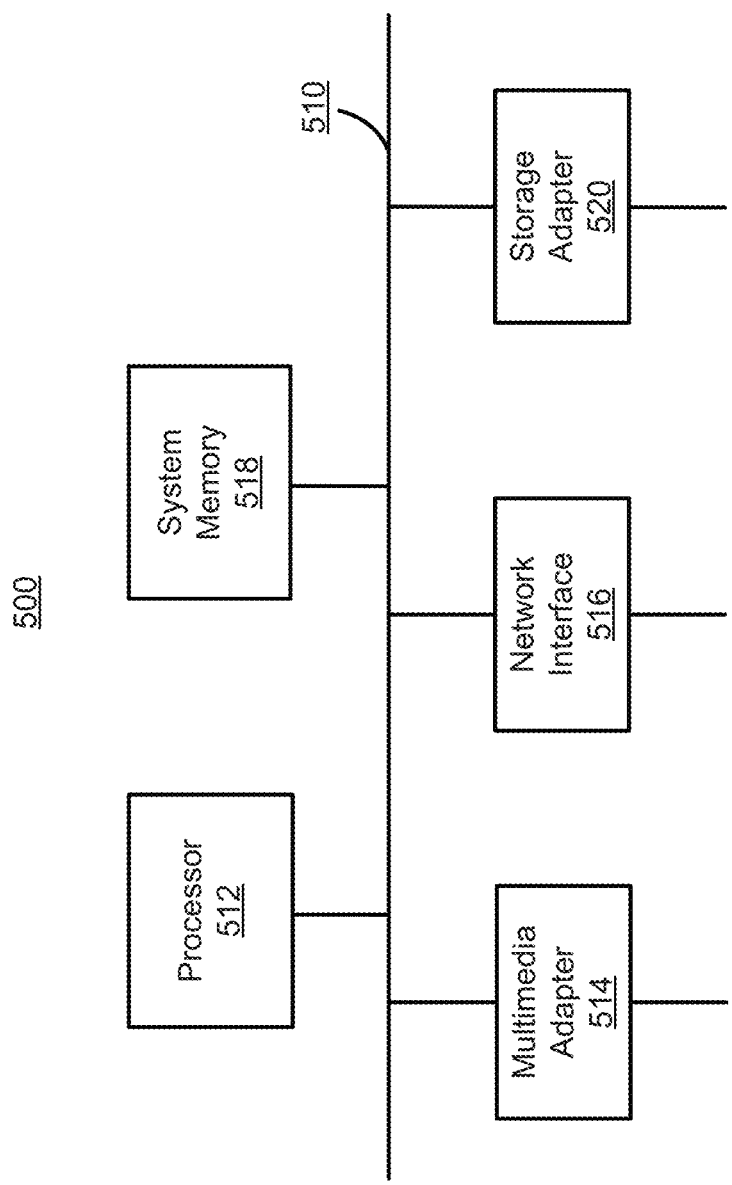
FIG. 5 illustrates a block diagram of a computer system for sentiment driven risk adjustable digital content management, according to an example.

FIG. 5 illustrates a block diagram of a computer system for sentiment driven risk adjustable digital content management, according to an example. The computer system 500 may be part of or any one of the client devices 110, the external system 130, the host systems 140, and/or the system 100 and/or 300 to perform the functions and features described herein. The computer system 500 may include, among other things, an interconnect 510, a processor 512, a multimedia adapter 514, a network interface 516, a system memory 518, and a storage adapter 520.

The interconnect 510 may interconnect various subsystems, elements, and/or components of the computer system 500. As shown, the interconnect 510 may be an abstraction that may represent any one or more separate physical buses, point-to-point connections, or both, connected by appropriate bridges, adapters, or controllers. In some examples, the interconnect 510 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 510 may allow data communication between the processor 512 and system memory 518, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 512 may be the central processing unit (CPU) of the computing device and may control overall operation of the computing device. In some examples, the processor 512 may accomplish this by executing software or firmware stored in system memory 518 or other data via the storage adapter 520. The processor 512 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 514 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 516 may provide the computing device with an ability to communicate with a variety of remove devices over a network (e.g., network 120 of FIG. 1) and may include, for example, an Ethernet adapter, a Fibre Channel adapter, and/or other wired- or wireless-enabled adapter. The network interface 516 may provide a direct or indirect connection from one network element to another, and facilitate communication and between various network elements.

The storage adapter 520 may connect to a standard computer-readable medium for storage and/or retrieval of information, such as a fixed disk drive (internal or external).

Many other devices, components, elements, or subsystems (not shown) may be connected in a similar manner to the interconnect 510 or via a network (e.g., network 120 of FIG. 1B). Conversely, all of the devices shown in FIG. 5 need not be present to practice the present disclosure. The devices and subsystems can be interconnected in different ways from that shown in FIG. 5. Code to implement the dynamic approaches for payment gateway selection and payment transaction processing of the present disclosure may be stored in computer-readable storage media such as one or more of system memory 518 or other storage. Code to implement the dynamic approaches for payment gateway selection and payment transaction processing of the present disclosure may also be received via one or more interfaces and stored in memory. The operating system provided on computer system 500 may be MS-DOS®, MS-WINDOWS®, OS/2®, OS X®, IOS®, ANDROID®, UNIX®, Linux®, or another operating system.

Figure 6:
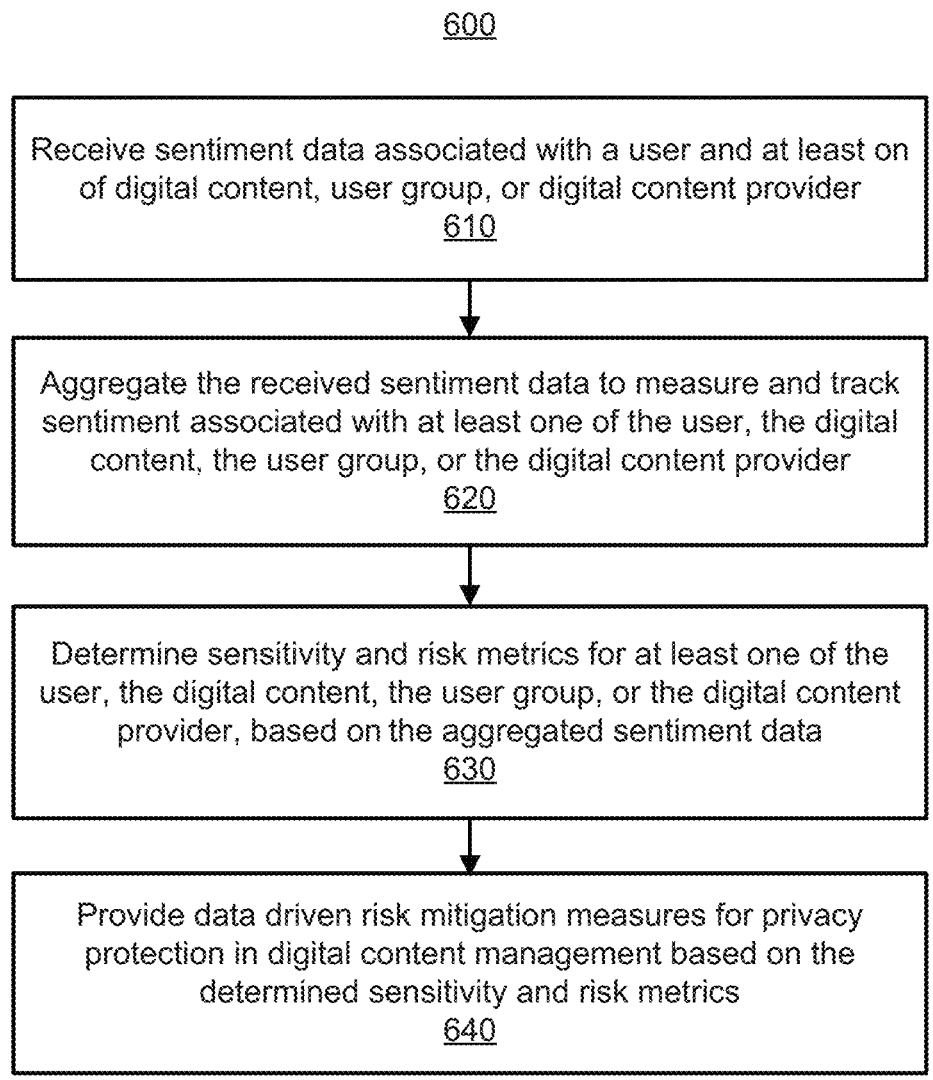
FIG. 6 illustrates a method for sentiment driven risk adjustable digital content management, according to an example.

FIG. 6 illustrates a method for sentiment driven risk adjustable digital content management, according to an example. The method 600 is provided by way of example, as there may be a variety of ways to carry out the method described herein. Although the method 600 is primarily described as being performed by system 100 as shown in FIG. 1 or computer system 500 of FIG. 5, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein.

At 610, the processor 101 may receive sentiment data. In some examples, the sentiment data may be associated with a user and at least one of digital content, user group, or digital content provider. In some examples, the sentiment data may be received in real-time (or near real-time) and based on sentiment feedback. The sentiment feedback may be associated with at least one of the following: digital content impression, user action to find out why digital content was presented to the user, user action to block the digital content provider, user action to drop out of the user group, a sensitivity ratio (SR), a drop-out ratio (DR), a signal-to-group mapping, a group-to-digital content mapping, or other feedback. In some examples, the sensitivity ratio (SR) may be determined based on a sum of the user actions to find out why digital content was presented to the user divided by a sum of the digital content impressions. In some examples, the drop-out ratio (DR) may be determined based on a sum of the user actions to block the digital content provider and the user actions to drop out of the user group divided by a sum of the user actions to find out why digital content was presented to the user.

At 620, the processor 101 may aggregate the received sentiment data. In some examples, the aggregated sentiment data may be used to measure and track sentiment associated with at least one of the user, the digital content, the user group, or the digital content provider. As described herein, the aggregated sentiment data may be used for user privacy protection and risk management.

At 630, the processor 101 may determine sensitivity and risk metrics for at least one of the user, the digital content, the user group, or the digital content provider, based on the aggregated sentiment data. In some examples, the sensitivity and risk metrics may be determined based on sensitivity data, and mapping among users, signals, digital contents, user groups, digital content providers and other entities. In some examples, determining the sensitivity and risk metrics may include additional actions. For example, determining the sensitivity and risk metrics may include calculating risk vectors, as described herein. In some examples, these risk vectors may be calculated for each of at least one of users, signals, digital content, user group, or digital content provider. In some examples, determining the sensitivity and risk metrics may include propagating the sentiment data back up a data flow chain to calculate the risk vectors.

At 640, the processor 101 may provide data driven risk mitigation measures (or sentiment driven risk mitigation measures). In some examples, these data driven risk mitigation measures may be determined based on the determined sensitivity and risk metrics. Furthermore, these data driven risk mitigation measures may be used by the system 100 to enhance privacy protection in digital content management, in accordance with any number of privacy or data laws, regulations, and/or policies.

In some examples, these data driven risk mitigation measures may be used to help determining whether to display the digital content to a user. For example, a business with repeated privacy violations, and all the digital content it supplies, may be assigned a higher risk score. In another example, a user or user group that has been more sensitive may be assigned a higher sensitivity score, indicating higher sensitivity levels. In yet another example, digital content or ads that may have more negative risk score may more likely to trigger negative sentiments. Additionally, when serving digital content to a user, the content's risk score may be compared to the user's sensitivity tolerance threshold, which may be used to determine whether to serve or provide this piece of content to this particular user. Similarly, by comparing the ad's risk score with a group's sensitivity threshold, the method 600 may then determine whether an organizational entity (or advertiser) should or could target this group with this piece of content, or if an advertisement account, for example, that has very high risk scores, such a scenario may necessitate extra caution before approval.

It should be appreciated that the method 600 may include a variety of other actions. These may include, among other things, determining sensitivity and risk metrics using any number of matrix representations and/or calculations described above. Furthermore, the method 600 may also involve providing or taking action on any of the data driven risk mitigation measures or sentiment driven risk mitigation measures.

By providing techniques to monitor, track, and determine sensitivity and risk metrics associated with digital content presented to users as described herein, the systems and methods described herein may maximize utilization of resources, minimize undue privacy risks, increase speed of processing, minimize energy consumption, and enhance relationships with users and content providers. As a result, it should be appreciated that examples described herein may have a flexible structure and offer many advantages over other conventional solutions.

Although the methods and systems as described herein may be directed mainly to potentially private, personal, or sensitive data associated with digital content presented to users, it should be appreciated that the system 100 may be used for other types of content or scenarios. Furthermore, the system 100 may also use the techniques disclosed herein in other various environments, such as in load balancing systems, distributed architecture schemes, or for various digital content processing or transactions, such as advertisement transactions, payment transactions, online transactions, mobile transactions, user-to-user transactions, toll-based transactions, and/or digital transactions. Other applications or uses of the system 100 may also include social networking, competitive, marketing, performance analysis, risk analysis, data management, content-based recommendation engines, and/or other types of knowledge or data-driven systems.

It should be noted that the functionality described herein may be subject to one or more privacy policies, described below, enforced by the system 100 that may bar use of images for concept detection, recommendation, generation, and analysis.

In particular examples, one or more objects (e.g., content or other types of objects) of a computing system may be associated with one or more privacy settings. The one or more objects may be stored on or otherwise associated with any suitable computing system or application, such as, for example, the system 100, the client devices 110, the host systems 140, the external system 130, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100 or shared with other systems (e.g., an external system 130). Although this disclosure describes using particular privacy settings in a particular manner, this disclosure contemplates using any suitable privacy settings in any suitable manner.

In particular examples, the system 100 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100 may access such information in order to provide a particular function or service to the first user, without the system 100 having access to that information for any other purposes. Before accessing, storing, or using such objects or information, the system 100 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 100.

In particular examples, a user may specify whether particular types of objects or information associated with the first user may be accessed, stored, or used by the system 100. As an example and not by way of limitation, the first user may specify that images sent by the first user through the system 100 may not be stored by the system 100. As another example and not by way of limitation, a first user may specify that messages sent from the first user to a particular second user may not be stored by the system 100. As yet another example and not by way of limitation, a first user may specify that all objects sent via a particular application may be saved by the system 100.

In particular examples, privacy settings may allow a first user to specify whether particular objects or information associated with the first user may be accessed from client devices 110 or external systems 130. The privacy settings may allow the first user to opt in or opt out of having objects or information accessed from a particular device (e.g., the phone book on a user's smart phone), from a particular application (e.g., a messaging app), or from a particular system (e.g., an email server). The system 100 may provide default privacy settings with respect to each device, system, or application, and/or the first user may be prompted to specify a particular privacy setting for each context. As an example and not by way of limitation, the first user may utilize a location-services feature of the system 100 to provide recommendations for restaurants or other places in proximity to the user. The first user's default privacy settings may specify that the system 100 may use location information provided from one of the client devices 110 of the first user to provide the location-based services, but that the system 100 may not store the location information of the first user or provide it to any external system 130. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100 may use a user's previous activities and calculated moods, emotions, or sentiments to determine a present mood, emotion, or sentiment. A user who wishes to enable this functionality may indicate in their privacy settings that they opt in to the system 100 receiving the inputs necessary to determine the mood, emotion, or sentiment. As an example and not by way of limitation, the system 100 may determine that a default privacy setting is to not receive any information necessary for determining mood, emotion, or sentiment until there is an express indication from a user that the system 100 may do so. By contrast, if a user does not opt in to the system 100 receiving these inputs (or affirmatively opts out of the system 100 receiving these inputs), the system 100 may be prevented from receiving, collecting, logging, or storing these inputs or any information associated with these inputs. In particular examples, the system 100 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100 may use the user's mood, emotion, or sentiment to provide newsfeed items, pages, friends, or advertisements to a user. The user may specify in their privacy settings that the system 100 may determine the user's mood, emotion, or sentiment. The user may then be asked to provide additional privacy settings to indicate the purposes for which the user's mood, emotion, or sentiment may be used. The user may indicate that the system 100 may use his or her mood, emotion, or sentiment to provide news feed content and recommend pages, but not for recommending friends or advertisements. The system 100 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 100 may be restricted in its access, storage, or use of the objects or information. The system 100 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100 may temporarily store the message in a content data store until the second user has viewed or downloaded the message, at which point the system 100 may delete the message from the data store. As another example and not by way of limitation, continuing with the prior example, the message may be stored for a specified period of time (e.g., 2 weeks), after which point the system 100 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100. The user's privacy settings may specify that such information may be used only for particular processes, such as authentication, and further specify that such information may not be shared with any external system 130 or used for other processes or applications associated with the system 100. As another example and not by way of limitation, the system 100 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system 130 or used by other processes or applications associated with the system 100. As another example and not by way of limitation, the system 100 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system 130 or used by other processes or applications associated with the system 100.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the system 100 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100 may send a reminder to the user to confirm his or her privacy settings every six months or after every ten photo posts. In particular examples, privacy settings may also allow users to control access to the objects or information on a per-request basis. As an example and not by way of limitation, the system 100 may notify the user whenever an external system 130 attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
  a processor; and
  a memory storing instructions, which when executed by the processor, cause the processor to:
    receive sentiment data associated with a user and at least one of a digital content, a user group, or a digital content provider, wherein the sentiment data is received based on sentiment feedback associated with digital content impressions and user actions to find out why the digital content was presented to the user;
    aggregate the received sentiment data to measure and track sentiment associated with at least one of the user, the digital content, the user group, or the digital content provider, wherein the aggregated sentiment data is used to manage risk and user privacy protection;
    determine sensitivity and risk metrics, comprising determining a sensitivity ratio (SR), for at least one of the user, the digital content, the user group, or the digital content provider, the sensitivity and risk metrics determined based on the aggregated sentiment data, wherein the sensitivity ratio (SR) is determined based on the user actions to find out why the digital content was presented to the user divided by the digital content impressions; and
    provide data driven risk mitigation measures for privacy protection in digital content management based on the determined sensitivity and risk metrics.

2. The system of claim 1, wherein the sentiment data is received in real-time and wherein the sentiment feedback is further associated with at least one of the following: user actions to block the digital content provider, user actions to drop out of the user group, a drop-out ratio (DR), a signal-to-group mapping, or a group-to-digital content mapping.

3. The system of claim 2, wherein the drop-out ratio (DR) is determined based on a sum of the user actions to block the digital content provider and the user actions to drop out of the user group divided by a sum of the user actions to find out why digital content was presented to the user.

4. The system of claim 1, wherein the sensitivity ratio (SR) is determined based on a sum of the user actions to find out why digital content was presented to the user divided by a sum of the digital content impressions.

5. The system of claim 1, wherein the sensitivity and risk metrics are determined based on sensitivity data and mapping among users, signals, digital contents, user groups, digital content providers and other entities.

6. The system of claim 1, wherein the instructions that cause the processor to determine the sensitivity and risk metrics further comprise instructions that cause the processor to:
  calculate risk vectors, wherein the risk vectors are calculated for at least one of users, signals, digital contents, user groups, or digital content providers.

7. The system of claim 6, wherein the instructions that cause the processor to determine the sensitivity and risk metrics further comprise instructions that cause the processor to:
  propagate the sentiment data back up a data flow chain to calculate the risk vectors.

8. A method, comprising:
  receiving, by a processor, sentiment data associated with a user and at least one of digital content, user group, or digital content provider, wherein the sentiment data is received based on sentiment feedback associated with digital content impressions and user actions to find out why the digital content was presented to the user;
  aggregating, by the processor, the received sentiment data to measure and track sentiment associated with at least one of the user, the digital content, the user group, or the digital content provider, wherein the aggregated sentiment data is used for user privacy protection and risk management;
  determining, by the processor, sensitivity and risk metrics, comprising determining a sensitivity ratio (SR), for at least one of the user, the digital content, the user group, or the digital content provider, based on the aggregated sentiment data, wherein the sensitivity ratio (SR) is determined based on the user actions to find out why the digital content was presented to the user divided by the digital content impressions; and
  providing, by the processor, data driven risk mitigation measures for privacy protection in digital content management based on the determined sensitivity and risk metrics.

9. The method of claim 8, wherein the sentiment data is received in real-time and wherein the sentiment feedback is further associated with at least one of the following: user actions to block the digital content provider, user actions to drop out of the user group, a drop-out ratio (DR), a signal-to-group mapping, or a group-to-digital content mapping.

10. The method of claim 9, wherein the drop-out ratio (DR) is determined based on a sum of the user actions to block the digital content provider and the user actions to drop out of the user group divided by a sum of the user actions to find out why digital content was presented to the user.

11. The method of claim 8, wherein the sensitivity ratio (SR) is determined based on a sum of the user actions to find out why digital content was presented to the user divided by a sum of the digital content impressions.

12. The method of claim 8, wherein the sensitivity and risk metrics are determined based on sensitivity data and mapping among users, signals, digital contents, user groups, digital content providers and other entities.

13. The method of claim 8, wherein determining the sensitivity and risk metrics comprises:
propagating the sentiment data back up a data flow chain; and
calculating risk vectors for each of at least one of users, signals, digital contents, user groups, or digital content providers.

14. A non-transitory computer-readable storage medium storing instructions, which when executed, cause a processor to:
receive sentiment data associated with a user and at least one of digital content, user group, or digital content provider, wherein the sentiment data is received based on sentiment feedback associated with digital content impressions and user actions to find out why the digital content was presented to the user;
aggregate the received sentiment data to measure and track sentiment associated with at least one of the user, the digital content, the user group, or the digital content provider, wherein the aggregated sentiment data is used for user privacy protection and risk management;
determine sensitivity and risk metrics, comprising determining a sensitivity ratio (SR), for at least one of the user, the digital content, the user group, or the digital content provider, based on the aggregated sentiment data, wherein the sensitivity ratio (SR) is determined based on the user actions to find out why the digital content was presented to the user divided by the digital content impressions; and
provide data driven risk mitigation measures for privacy protection in digital content management based on the determined sensitivity and risk metrics.

15. The non-transitory computer-readable storage medium of claim 14, wherein the sentiment data is received in real-time and wherein the sentiment feedback is associated with at least one of the following: user actions to block the digital content provider, user actions to drop out of the user group, a drop-out ratio (DR), a signal-to-group mapping, or a group-to-digital content mapping.

16. The non-transitory computer-readable storage medium of claim 15, wherein the drop-out ratio (DR) is determined based on a sum of the user actions to block the digital content provider and the user actions to drop out of the user group divided by a sum of the user actions to find out why digital content was presented to the user.

17. The non-transitory computer-readable storage medium of claim 14, wherein the sensitivity ratio (SR) is determined based on a sum of the user actions to find out why digital content was presented to the user divided by a sum of the digital content impressions.

18. The non-transitory computer-readable storage medium of claim 14, wherein the sensitivity and risk metrics are determined based on sensitivity data and mapping among users, signals, digital contents, user groups, digital content providers and other entities.

19. The non-transitory computer-readable storage medium of claim 14, wherein the instructions that cause the processor to determine the sensitivity and risk metrics further comprise instructions that cause the processor to:
calculate risk vectors, wherein the risk vectors are calculated for at least one of users, signals, digital contents, user groups, or digital content providers.

20. The non-transitory computer-readable storage medium of claim 19, wherein the instructions that cause the processor to determine the sensitivity and risk metrics further comprise instructions that cause the processor to:
propagate the sentiment data back up a data flow chain to calculate the risk vectors.

* * * * *